United States Patent Office 3,566,448
Patented Mar. 2, 1971

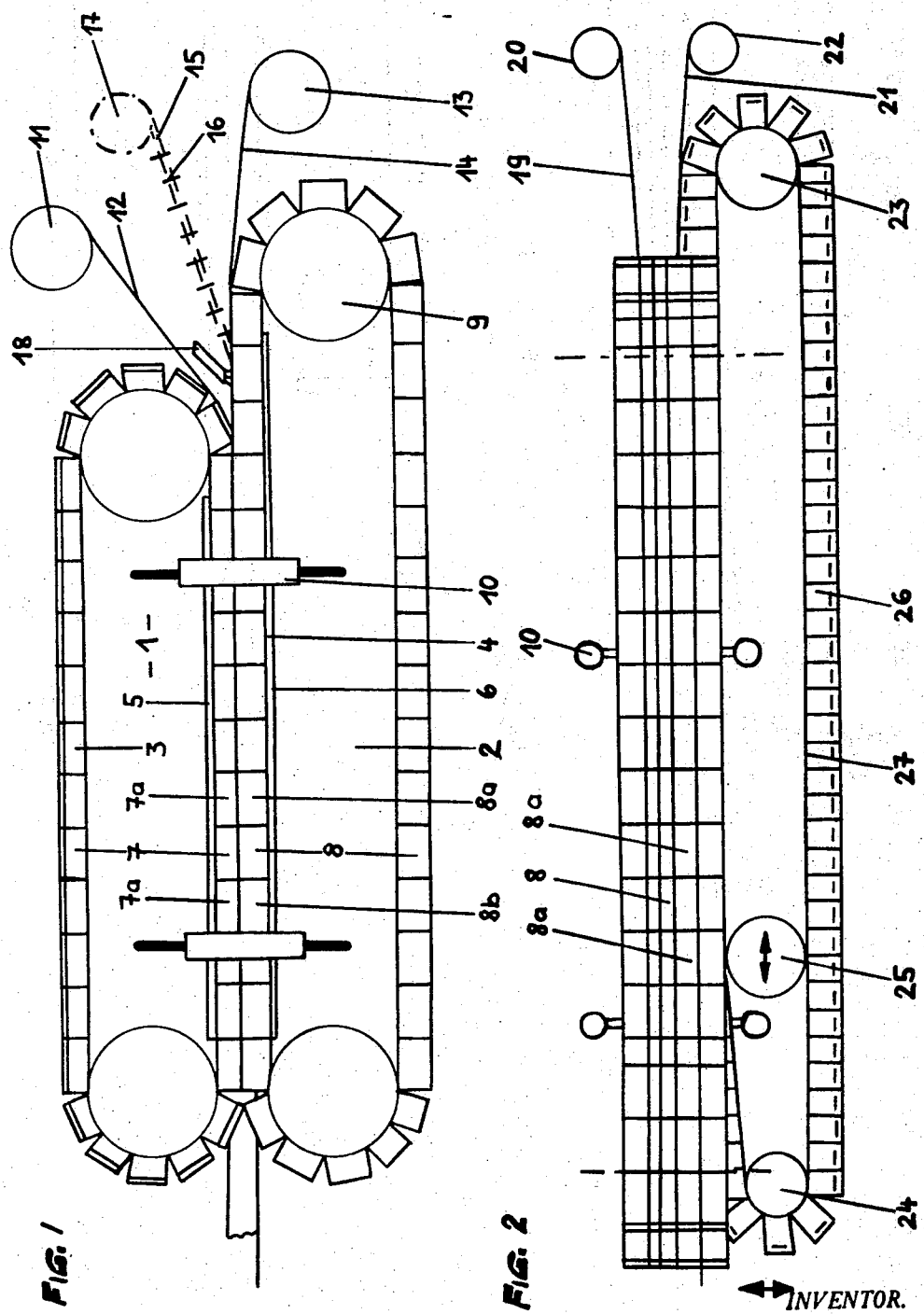

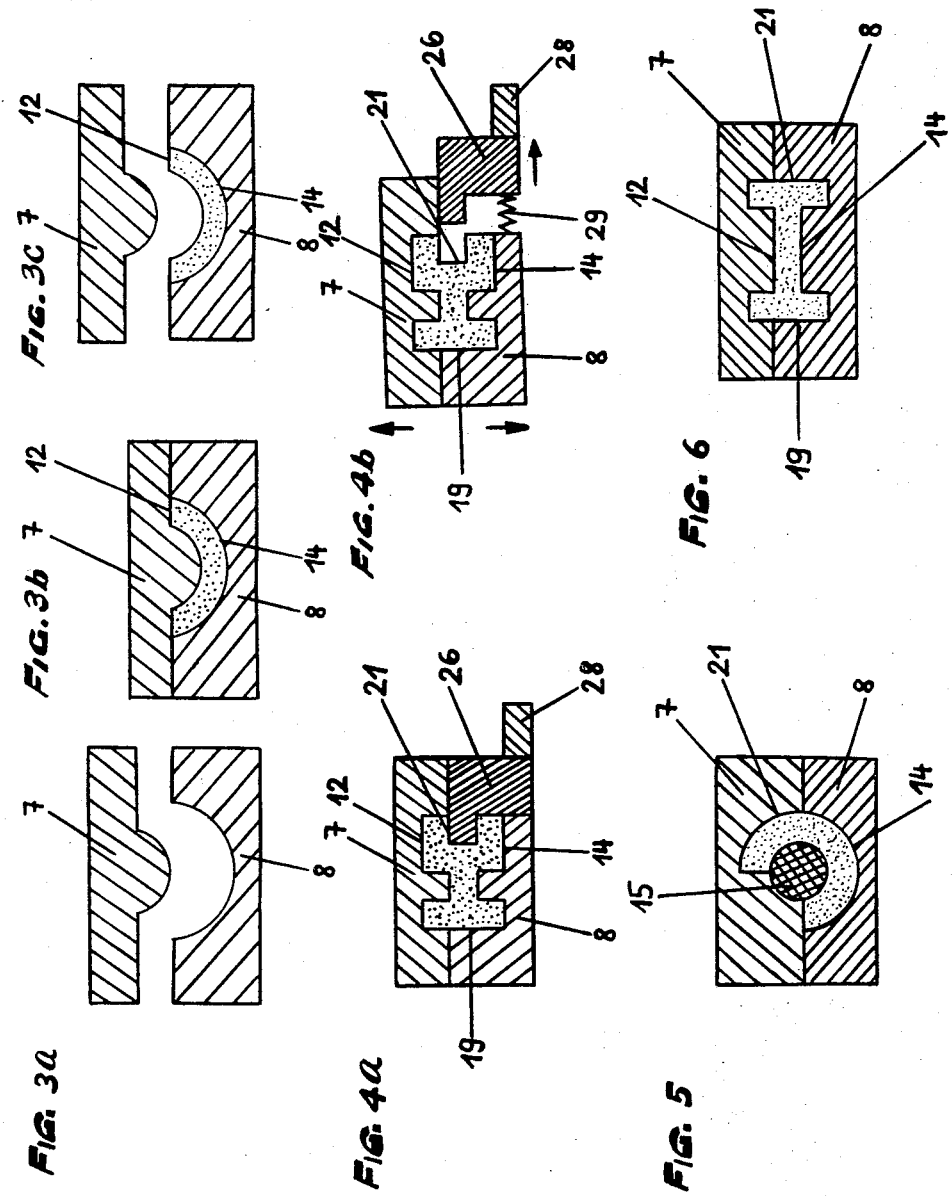

3,566,448
APPARATUS FOR THE CONTINUOUS PRODUCTION OF SECTIONS OF FOAMED MATERIALS, PARTICULARLY ON A POLYURETHANE BASE
Rudolf Ernst, Strasslach, near Munich, Germany, assignor to Maschinenfabrik Hennecke Gesellschaft mit beschrankter Haftung, Leverkusen, Germany
Filed July 16, 1968, Ser. No. 745,160
Claims priority, application Germany, July 27, 1967,
M 74,954
Int. Cl. B29c *15/00*
U.S. Cl. 18—4                                             6 Claims

ABSTRACT OF THE DISCLOSURE

Apparatus for the continuous production of structural sections of foamed or spongy materials where a hollow space is defined between two conveyor bands disposed one over the other, which move at a speed corresponding to the reaction velocity of the foam mass and/or corresponding to the quantity of the mass, and where the hollow space is formed by split forms that abut against one another.

BACKGROUND OF THE INVENTION

The present invention relates to the production of profiles, or sections, made of foam material. More in particular, the invention concerns a method for the continuous production of sections of foam material, especially on a polyurethane base and apparatus for practicing the method.

The continuous production of sections or profiles of foam materials has not been known heretofore. The continuous production of endless plates, webs or foils from foamable substances is known where the reaction components are introduced after their combination in the space between two endless conveyors which move continuously at the speed corresponding to the reaction velocity. This space between the conveyor bands is limited laterally by adjustable stationary rails or guide members which revolve with the conveyor bands. In order to protect the conveyor bands and the lateral limiting strips, foils may be inserted which constitute a covering material for the end product to be produced. Although there is a large demand for sections or profiles which are made in a continuous process from foamable or spongy material, no method has thus far become known by means of which such production would be possible.

SUMMARY OF THE INVENTION

It is an object of the invention to provide a method and an apparatus of the aforementioned type for the production of sections, or profiles, of foamable substances, particularly those having a polyurethane base. In accordance with the invention, this problem is solved in that the mass of foam material is introduced in a hollow space which corresponds to the desired cross-section or profile, and which moves at a velocity corresponding to the velocity of the reaction and/or to the quantity of the foam material.

By suitable movement and forming of the hollow space, it is possible to produce sections of foam material having the most variegated cross-sectional shapes. These sections may be used as carrying and supporting structural elements. For example, it is possible to make complicated window frame sections in this manner.

Advantageously, covering foils may be introduced in the hollow space before the application of the foam material components in such a manner that the walls of the hollow space are protected prior to the direct spraying with the foam material whereby adhesion of the same on the walls of the hollow space is avoided and safe discharge or ejection of the final product after hardening of the foam material is insured. However, the foils may also be such which beyond the protection of the walls of the hollow space also result in enhancement of the product produced. The foils may be of the most variegated materials, for example, paper, plastic and metal, particularly aluminum.

The foils are able to protect the section produced against the penetration of water, or they can increase the rigidity and the supporting strength of the section.

The apparatus for carrying out the method in accordance with the invention comprises advantageously two superimposed conveyor bands, between which the hollow space for foaming is formed, and which are moved at a velocity corresponding to the reaction velocity and/or the quantity of the material.

If in addition to its expansion laterally the section also has a relatively great expansion in height, it is advantageous to form the hollow space by separated or split forms, one of which is arranged to abut immediately the corresponding next form half at the upper band and the other to abut immediately the next corresponding form half at the lower band. In this manner, it is also possible without difficulty to reverse high forms about the reversing rollers in direction of the conveyor bands because with this reverse movement they can be guided to be separated at the side which is remote from the conveyor band. With straight-line movement of the conveyor band, however, there still remains an elongated closed form which is composed of the individual abutting form sections.

In order to produce sections that are differently formed by means of the same conveyor installation, the forms or form halves, may be arranged interchangeably on their conveyor bands.

For the production of sections which have such a complicated cross-sectional form that when only two form halves are used, they can no longer be withdrawn upwardly and downwardly for releasing the section produced when the production operation is terminated, it is of advantage to again sub-divide at least one of the form halves and to laterally withdraw one of these parts before withdrawing the form halves.

This part which can be withdrawn laterally may be arranged upon a side conveyor band which runs synchronously with the conveyor bands so that toward the end of the production process after the hardening of the foam mass, it can be withdrawn laterally in a desired manner.

This, however, may advantageously also be achieved by a stationary guide means, against which the part of the corresponding form half that is to be withdrawn laterally is spring biased and arranged in such a manner that it insures the lateral withdrawing at the desired moment with respect to the reaction time of the foam mass.

The side conveyor band, as well as also the guide means for the parts to be laterally withdrawn, may be advantageously arranged for adaptation to the most variegated production.

For the production of sections which have backcut or undercut portions, which can no longer be made after hardening of the foam mass by lateral withdrawing of the form half parts, a center core-cord provided with spacers may advantageously be introduced prior to feeding in the starting mass, and prior to bringing together the form halves in the hollow space.

In this connection, it is of particular advantage if the spacers, or space determining members, are made of the same material as the end product to be produced so that the spacing members which are adapted to the cross-sectional dimensions of the section becomes a part of the section after termination of the production process.

The core-cord must be pulled out longitudinally from the section produced upon termination of the production method which is made possible by the production thereof from suitable work materials and by developing a suitably smooth surface.

Advantageously, the tracks of the conveyor bands are connected with one another by hydraulic pistons and cylinders which, in addition to the weight of the upper track, are able to produce a pressure force that counteracts the foam pressure. In addition, these pistons and cylinders can be used for setting and readjusting the distances between the conveyor bands.

BRIEF DESCRIPTION OF THE DRAWINGS

Further advantageous features and details of the invention will become apparent from the accompanying drawings which illustrate the invention with reference to different embodiments, and in which FIG. 1 is a side view of the apparatus for carrying out the method in accordance with the invention, FIG. 2 is a top view of the reaction space of the apparatus in accordance with FIG. 1 where an additional arrangement is illustrated for guiding form parts that can be laterally withdrawn, FIGS. 3a, 3b, and 3c show in cross-section three different positions of form halves for producing a semi-round section, FIGS. 4a and 4b show in cross-section two different positions for producing a section of complicated configurations where lateral withdrawal of form parts is necessary, FIG. 5 is a cross-section of form halves for producing a section having a backout or recess where a core-cord, or cable, is used with spacing elements, and FIG. 6 is a cross-section through form halves for producing a double-T profile.

DESCRIPTION OF THE INVENTION

The double conveyor installation illustrated in FIG. 1 comprises essentially an upper conveyor track 1 and a lower conveyor track 2, and the corresponding conveyor bands 3 and 4. Form halves 7 and 8 are arranged on the conveyor bands 3 and 4 which are separated from one another transversely of the direction of conveying in a manner that for straight-line conveyor movement they are spaced from the form halves 7a or 8a to form a smooth, uninterrupted hollow space for forms, and that where they reverse about the reversing rollers 9, they are separated from one another at the sides that are remote from the conveyor bands 3 or 4 in order to provide for an unobjectionable reversing movement. The conveyor bands are suitably supported by the supporting plates 5 and 6. The conveyor belts 3 and 4 will be driven by a drive motor in a known manner. The synchronization of movement of both conveyor bands 3 and 4 is by way of suitable drive chains.

The spraying of the unreacted mixed initial mass onto the lower conveyor band which is somewhat projected forward, or onto the lower form halves that form a pan is effected at 18. For protecting the forms, and for covering the end product, foils 12 and 14 which move synchronously with the conveyor movement may be introduced, which are drawn or pulled from supply drums 11 and 13.

The two conveyor tracks are connected with one another by hydraulic pistons and cylinders 10. These hydraulic pistons and cylinders 10 are attached to the conveyor tracks 1 and 2 in such a way, that the pistons are attached at any given time to the upper conveyor track 1, and the cylinders are attached to the lower conveyor track 2. When the cylinders are filled with hydraulic fluid, the conveyor tracks 1 and 2 move apart. By setting up a predetermined pressure in the cylinders 10, the form halves 7 and 8 on conveyor belts 3 and 4 are pressed together in a desired manner. This pressure is adjusted in such a way that it constitutes a safety pressure, which, if exceeded, causes one conveyor band to be raised from the other. For example, if the mixture introduced into the form cavities is of the wrong composition, the safety pressure may be exceeded. Thus, the hydraulic pistons and cylinders 10 constitute a means for adjusting the distance between the conveyor tracks 1 and 2 and thereby the conveyor belts 3 and 4, and they constitute moreover a safety device, which becomes effective if the predetermined pressure in the form cavity between the conveyor belts 3 and 4 is exceeded.

For producing profiles with backout or undercut portions, it is suitable prior to bringing together the form halves 7 and 8, and prior to feeding in the initial mix to introduce a core-cord 15 having spacers 16 which is unwound from a suitably arranged supply roller 17. The parts 15, 16 and 17 are shown in dashed lines because they are only required for producing sections having particular cross-sectional shapes. The shaft of the return roller 24 is carried in a long slot, which extends perpendicularly to the direction of operation of conveyor belt 27, whereby the distance of return roller 24 relative to conveyor belt 3 and 4 can be changed, as indicated by the arrow at the left hand end of FIG. 2.

The shaft of guide roller 25 is carried and fastened in a similar manner in an elongated slot, which extends parallel to the direction of operation of conveyor belt 27, whereby a shift in the position of guide roller 25 is possible in the direction indicated by the other arrow in FIG. 2. The point of time at which the lateral form members 26 begin to be withdrawn out of the space between the form halves 7 and 8 can be readily changed, which becomes apparent from FIGS. 4a and 4b.

The arrangement illustrated in FIG. 2 corresponds essentially to that of FIG. 1 and is a top view onto the reaction space thereof. In addition to the conveyor bands 3 and 4 which define the hollow reaction space, a lateral conveyor band 27 is provided which has form members 26 which can be withdrawn laterally and which for the production of a complicated section in accordance with FIG. 4, must be withdrawn laterally prior to the separating of the upper and lower form halves 7 and 8, such as it is accomplished by means of the reversing rollers 24 of smaller diameter. The reversing roller 24 is adustable essentially perpendicularly to the conveyor direction of the conveyor bands 3 and 4, and a guide roller 25 is generally horizontally adjustable with respect to the conveyor directions of the conveyor bands 3 and 4 as indicated by the arrows.

For the production of certain sections, lateral foils 18 and 21 which are fed in from supply rollers 20, 22 are introduced in addition to the upper and lower foils 12 and 14.

FIG. 3 illustrates three different positions of the form halves for producing a semi-round section. FIG. 3a shows the upper form half 7 before it constitutes a closed hollow form space, together with the lower form half 8. FIG. 3b shows the dense or sealed hollow form space, the walls of which are protected by the foils 12, 14. FIG. 3c illustrates a position in which the form halves 7, 8 have already been removed from one another and the foils 12, 14 constitute a cover for the semi-round sections thus produced.

FIG. 4 shows a cross-section of a relatively complicated section with its form parts, which section cannot be produced by simple separation of a lower and upper form half. Therefore the lower form half is sub-divided into two parts 8 and 26. The part 26 that can be withdrawn laterally may be secured either to the lateral conveyor 27 in order to be withdrawn laterally as illustrated in FIG. 4b prior to the separation of the form halves 7 and 8. The form halves 26 that can be withdrawn laterally, however, may also rest against a stationary guide rail 28, against which it is biased by springs 29 that are disposed between them and the lower form half 8. The manner of lateral withdrawal (side conveyor band 27 or forced guiding 28) is optional.

The spacer 16, which is utilized in connection with the production of the profiles or sections shown in FIG. 5, is in the form of a disc, which in the elevation view corresponds exactly to the view illustrated in FIG. 5 of the form cavity, which is already filled with foamable material. This disclike spacer 16 is placed upon core-cord 15 before the core-cord 15 is introduced into form cavity. The spacers 16 are suitably formed for the production of other profiles or sections, that is to say, the spacer 16 corresponds to the dimensions of the profiles or sections to be produced. Inasmuch as the spacers 16 are produced out of essentially the same foamable material as the desired end product, the spacers 16 remain in the product and do not affect the homogeneous structure.

FIG. 5 is a cross-section of a section which can no longer be produced by lateral withdrawing of one form half as in the case of the embodiment in accordance with FIG. 4. For this purpose, the core-cord 15 with spacers 16 is introduced prior to bringing together the form halves 7 and 8, and prior to the supply of the starting mass. This core-cord keeps the inner hollow space of the section free, and upon termination of the production process, it can be withdrawn in longitudinal direction.

FIG. 6 is a cross-section of double-T section with its form halves 7 and 8 which can be produced in a similar manner as the semi-round section in accordance with FIG. 3.

The use of the upper and lower foils 12 and 14 and of the side foils 19 and 21, depends on the manner of carrying out the method in accordance with the invention and on the cross-sectional shape of the section to be produced.

Having now described my invention with reference to the embodiments illustrated in the drawings, I do not wish to be limited thereto, but what I desire to protect by Letters Patent of the United States is set forth in the appended claims.

I claim:

1. Apparatus for continuous production of sections of foam material comprising:
    (a) a pair of conveyor bands extending generally parallel to one another having split forms disposed as form halves one on top of the other with the upper halves secured to the upper band and the lower halves to the lower band and with adjacent forms in abutting relationship, defining a space therebetween corresponding to the thickness of the sections to be produced, said conveyor bands being synchronized to run at the same speed and said speed corresponding to the speed of reaction of the foamable material,
    (b) means for introducing foamable material into said space,
the improvement for thereby producing sections having a cross-section not permitting withdrawal upwardly and downwardly of the form halves for releasing the sections produced when the production operation is terminated. which comprises:
    (c) at least one of said form halves comprising two parts, one of which is adapted and positioned to be laterally withdrawn to permit the withdrawal of other form parts by upward and downward movement.

2. Apparatus in accordance with claim 1, including a side conveyor band disposed laterally of and synchronized with said pair of conveyor bands proximate said form half comprising said part adapted to be laterally withdrawn.

3. Apparatus in accordance with claim 2 including reversing rollers at the ends of said side conveyor band, said side conveyor having a production end and one said roller at said production end having a smaller reversing radius than the other said reversing roller to facilitate said withdrawal.

4. Apparatus in accordance with claim 3, comprising an intermediate guide roller between said reversing rollers, said intermediate roller and said roller at said production end being displaceable.

5. Apparatus in accordance with claim 1 where said part of said one form half adapted to be laterally withdrawn is displaceable perpendicularly with respect to the direction of movement of one said conveyor band.

6. Apparatus in accordance with claim 5 including a stationary guide rail disposed laterally of said part of said one form half adapted to be laterally withdrawn, said part being spring biased, and a spring being disposed between said part and the other of said two part form half.

References Cited

UNITED STATES PATENTS

| | | | |
|---|---|---|---|
| 2,141,405 | 12/1938 | Randall | 18—4B |
| 2,281,860 | 5/1942 | Renault | 18—4BUX |
| 2,528,168 | 10/1950 | Paulsen | 18—6EX |
| 2,792,591 | 5/1957 | Cardot et al. | 18—4CX |
| 2,817,875 | 12/1957 | Harris et al. | 18—4B |
| 2,866,730 | 12/1958 | Potchen et al. | 18—4BUX |
| 2,974,361 | 3/1961 | Gerdse et al. | 18—4C |
| 3,039,137 | 6/1962 | Smith et al. | 18—4B |
| 3,035,302 | 5/1962 | Lysobey | 18—4CX |
| 3,065,500 | 11/1962 | Brener | 18—4B |
| 3,066,351 | 12/1962 | Schriner | 18—4BUX |
| 3,238,565 | 3/1966 | Jacobs | 18—4CX |
| 3,262,150 | 7/1966 | Morin | 18—4C |
| 3,262,151 | 7/1966 | Oxel | 18—4B |
| 3,269,088 | 8/1966 | Kath | 18—4CX |
| 3,298,064 | 1/1967 | Taga | 18—4CX |
| 3,313,010 | 4/1967 | Betz | 18—4BX |
| 3,351,977 | 11/1967 | Gash et al. | 18—4C |
| 3,382,303 | 5/1968 | Stieg | 18—4BX |
| 3,383,441 | 5/1968 | Norrhede et al. | 18—4BX |
| 3,462,795 | 8/1969 | Hermanns | 18—4B |

FRANK T. YOST, Primary Examiner

U.S. Cl. X.R.

18—6